United States Patent [19]

Schmidt

[11] 4,165,734
[45] Aug. 28, 1979

[54] SOLAR MOTOR

[76] Inventor: Gunter A. Schmidt, Hohenzollernstrasse 114, 8000 Munchen 13, Fed. Rep. of Germany

[21] Appl. No.: 810,480

[22] Filed: Jun. 27, 1977

[30] Foreign Application Priority Data

Jun. 25, 1976 [DE] Fed. Rep. of Germany ... 7620151[U]

[51] Int. Cl.² .............................................. F24J 3/02
[52] U.S. Cl. .................................... 126/424; 126/440
[58] Field of Search ................... 126/270, 271; 60/641

[56] References Cited

U.S. PATENT DOCUMENTS

| 937,013 | 10/1909 | Severy | 126/271 |
|---|---|---|---|
| 1,220,091 | 3/1917 | Goff | 126/271 |
| 3,985,118 | 10/1976 | Bard | 126/271 |
| 3,996,917 | 12/1976 | Trihey | 126/271 |
| 3,998,206 | 12/1976 | Jahn | 126/271 |
| 4,010,732 | 3/1977 | Sawata et al. | 126/271 |

Primary Examiner—Kenneth W. Sprague
Attorney, Agent, or Firm—Laurence R. Brown

[57] ABSTRACT

A steam generator derives solar energy by means of a plastic Fresnel lens mounted in a movable framework to follow the sun by means of a manually movable mechanism attached to the steam generator housing.

4 Claims, 2 Drawing Figures

SOLAR MOTOR

This invention relates to a solar motor with an optical radiation collector directed toward the sun and focussed upon a steam generator, or the like.

BACKGROUND OF THE INVENTION

Particularly in the regions near the equator, it has long been attempted to use sun rays as an energy source. Already power stations working with solar energy have been built and equipped with gigantic mirrors. For example, one use of solar energy for direct drive of smaller appliances such as irrigation pumps, has not yet been successful, since the necessary optical equipment, such as mirrors, spherical lenses, and the like, are expensive, sensitive and heavy.

OBJECTS AND FEATURES WITH BRIEF DESCRIPTION

An object of the invention therefore is to produce a solar motor of the aforementioned kind which is inexpensive, easy to operate and very strong. In accordance with the invention these problems are solved by a radiation collector consisting of a Fresnel lens, preferably plastic, which covers the steam generator framework. A Fresnel lens, or stepped lens, has the advantage that it is in a single plane, and the stepped surface can be simply made in a known manner. In particular, with regard to the construction of this lens from plastic, no particular requirement on the precision of the lens need be set. Then the cost of the lens is, for example, many times smaller than the cost of a spherical glass collecting lens of the same diameter. Also, the plastic stepped lens is considerably lighter than a comparable spherical glass lens, so that simpler production is afforded.

In accordance with a specially suitable embodiment of the invention the Fresnel lens is put together in more than one part, preferably sectors. By employment of a special holder, if necessary with a support grating, the parts may be fitted together, to further reduce the production cost, and also the replacement of a damaged single part is simple.

Briefly, in accordance with this invention, the solar motor with its weight, its simpleness in maintenance and its ruggedness in regions near the equator is suited as drive means for small and medium sized equipment, especially for irrigation pump stations or electric current generators and in some cases even for heaters.

THE DRAWINGS

In the drawings an embodiment of the invention is set forth, wherein.

Figure 1:
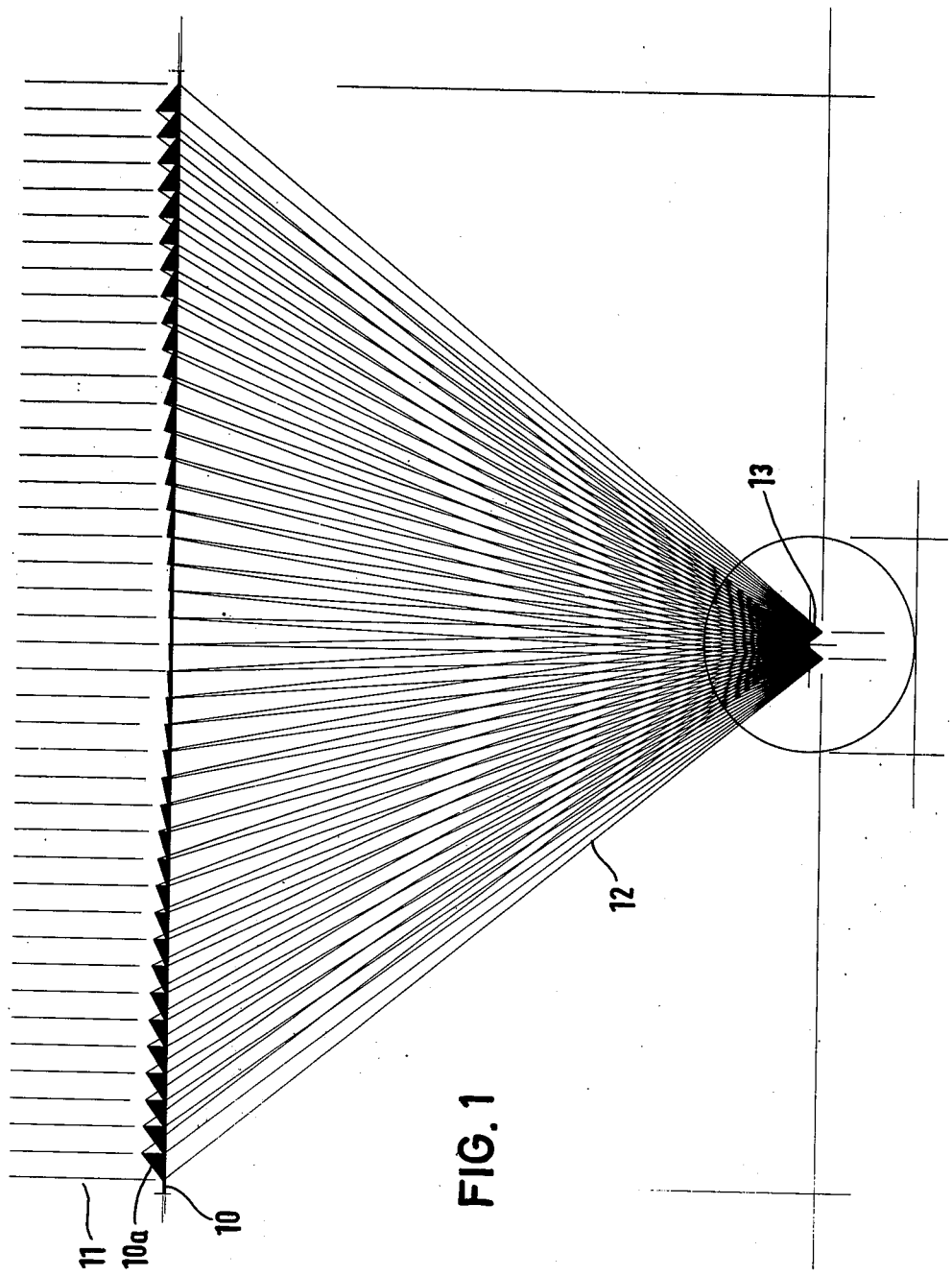
FIG. 1 is a schematic view of the Fresnel lens employed in the invention.

In accordance with FIG. 1, the Fresnel lens comprises a thin sheet 10, on which is seen at the upper surface the desired refraction producing steps 10a. The lens could be constructed out of glass or similar transparent plastic. Precision of the steps 10a is not a special requirement, nor is an optical diagram, but rather only the concentration of the rays at a focus point to provide a heating spot. The incoming light rays 11 are diffracted by the Fresnel lens 10 so that the diffracted rays 12 are focussed at heating spot 13.

Figure 2:
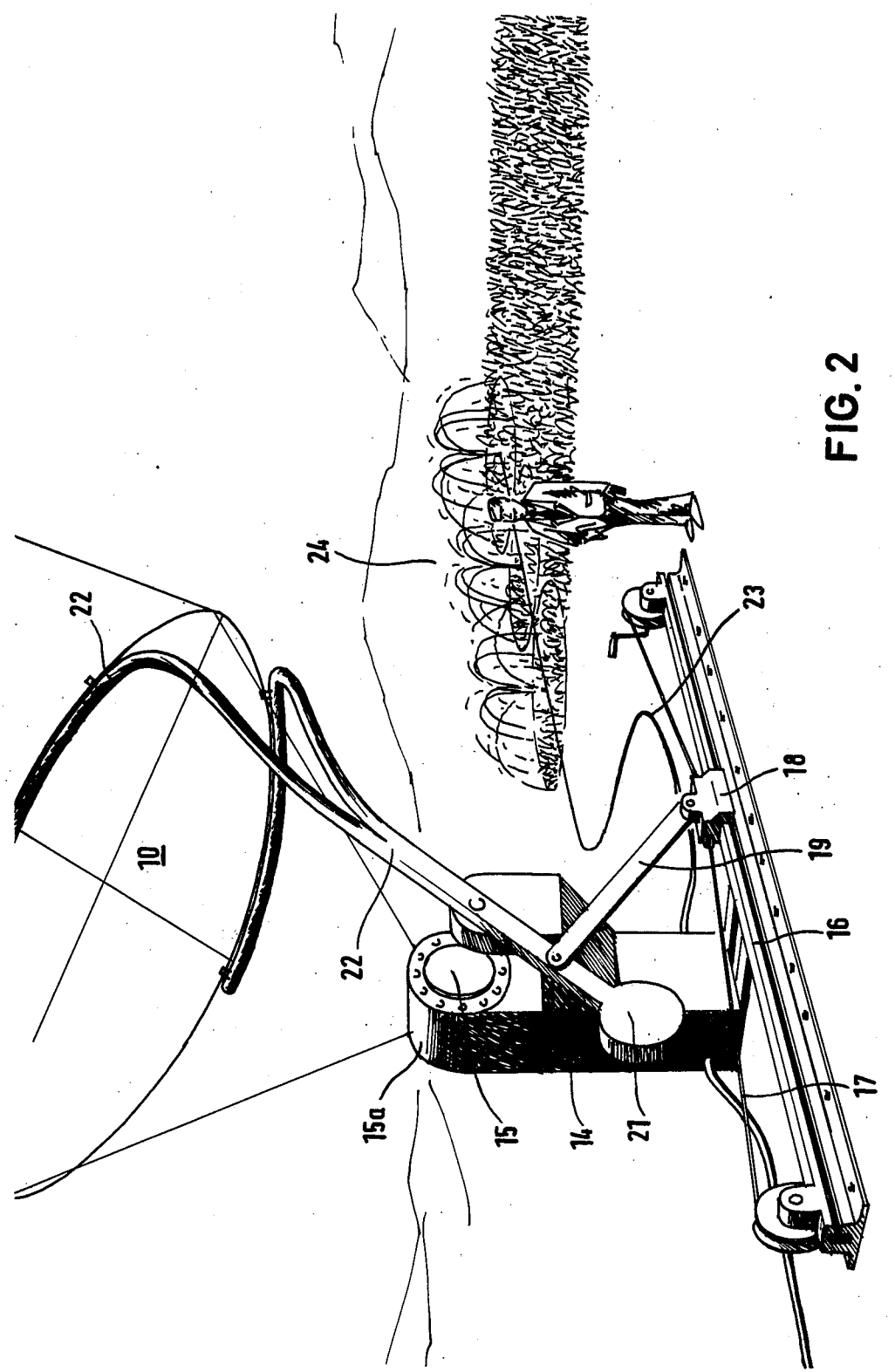
FIG. 2 is a perspective view of the solar motor.

In FIG. 2, 14 identifies a motor housing, which has in its upper portion a steam boiler 15, in its mid part a steam turbine and in its lower part a pump (not shown). A horizontal traverse bar 16 is fastened to the motor housing, along which a cable 17 moves a carriage 18. On the carriage 18 is pivoted by one end a link 19, which is pivoted on the other end to crank arm 20. This crank arm 20 is pivoted in its middle to the motor housing 14 and carries on the one extension to which the link 19 is fixed a counterweight 21, and on its other extension a frame 22 in which a Fresnel lens 10 according to FIG. 1 is affixed. Through pipe 23 the pump is coupled for transmission of water to sprinkler 24.

By the manual movement of carriage 18 the Fresnel lens 10 can be adjusted so that it is directed toward the sun. This adjustment means is sufficient in general, but it is also possible to provide a further adjustment means to rotate the pump housing with light in the vertical plane. The sun's rays will be directed by Fresnel lens 10 toward the housing portion 15a of the steam boiler 15 to heat the water therein. The housing portion 15a will be continuously heated and is made of non-reflecting heat conductive material. The steam from boiler 15 then drives the steam turbine which in turn drives the pump.

As previously explained, the Fresnel lens 10 can be put together from several sectors; and therefore frame 22 preferably has a grating support for holding the lens. It is therefore not necessary to provide the lens in a single piece.

It is to be understood that the invention can have several modifications, especially relating to the equipment moving the frame 22. Also, the invention is not restricted to an irrigation station, but for example also may be used for electric current, heating and the like.

What is claimed is:

1. A solar motor array comprising in combination an optical lens for gathering rays from the sun and having a focal point, a steam generator located at the lens focal point and disposed within a housing, a framework supporting the lens in spaced relationship with the steam generator, and means for directing the lens toward the sun as it moves, said means comprising a horizontal elongated traverse bar affixed to the housing, the traverse bar and the housing being stationary with respect to each other and supported by an external supporting member, a carriage axially movable along and carried by the bar, an arm carrying at one end said framework, said arm being rotatably supported by a bearing support affixed to the housing and being rotationally movable in a vertical plane, a link pivotably connected at one end to the carriage and upending therefrom with the other end pivotably connected to said arm eccentric of the rotatable bearing support of the arm, the link being movable in one of the vertical plane and a collateral vertical plane, and means for moving the carriage axially along the traverse bar so that the framework and the lens are moved.

2. The array of claim 1 wherein the link is pivotably connected to the arm distal of the rotatable support of the arm and the framework, and the means for moving the carriage comprises a cable.

3. The array of claim 1 wherein the traverse bar is provided with an elongated groove along the length thereof, a portion of the carriage is fitted to the groove for guided movement along the length of the traverse bar.

4. The array of claim 2 wherein a hand crank is rotatably supported along the traverse bar on one side of the carriage, a pully is rotatably supported along the traverse bar on the other side of the carriage, and the cable is strung along the length of the traverse bar between the crank and the pully, the cable being secured to the carriage and disposed for reelable movement about and between the crank and pully.

* * * * *